(12) United States Patent
Dowsett

(10) Patent No.: US 10,770,278 B2
(45) Date of Patent: Sep. 8, 2020

(54) EXTRACTION SYSTEM FOR CHARGED SECONDARY PARTICLES FOR USE IN A MASS SPECTROMETER OR OTHER CHARGED PARTICLE DEVICE

(71) Applicant: Luxembourg Institute Of Science and Technology (LIST), Esch-sur-Alzette (LU)

(72) Inventor: David Dowsett, Schuttrange (LU)

(73) Assignee: Luxembourg Institute of Science and Technology (LIST), Esch-sur-Alzette (LU)

(*) Notice: Subject to any disclaimer, the term of this patent is extended or adjusted under 35 U.S.C. 154(b) by 180 days.

(21) Appl. No.: 15/999,490

(22) PCT Filed: Feb. 17, 2017

(86) PCT No.: PCT/EP2017/053658
§ 371 (c)(1),
(2) Date: Aug. 20, 2018

(87) PCT Pub. No.: WO2017/140869
PCT Pub. Date: Aug. 24, 2017

(65) Prior Publication Data
US 2020/0058481 A1 Feb. 20, 2020

(30) Foreign Application Priority Data
Feb. 19, 2016 (LU) .......................... 92981

(51) Int. Cl.
*H01J 49/06* (2006.01)
*G01N 23/2258* (2018.01)
*H01J 49/14* (2006.01)

(52) U.S. Cl.
CPC ........ *H01J 49/061* (2013.01); *G01N 23/2258* (2013.01); *H01J 49/142* (2013.01)

(58) Field of Classification Search
CPC ... H01J 49/061; H01J 49/142; G01N 23/2258
(Continued)

(56) References Cited

U.S. PATENT DOCUMENTS

| 6,104,029 A | 8/2000 | Coxon et al. |
| 2015/0348770 A1 | 12/2015 | Hoang et al. |
| 2020/0058480 A1* | 2/2020 | Dowsett ................ H01J 49/061 |

FOREIGN PATENT DOCUMENTS

| WO | 2014108375 A1 | 7/2014 |
| WO | 2014108376 A1 | 7/2014 |

OTHER PUBLICATIONS

International Search Report for corresponding PCT/EP2017/053658 dated Jul. 11, 2017.
(Continued)

*Primary Examiner* — Nicole M Ippolito
(74) *Attorney, Agent, or Firm* — Sandberg Phoenix & von Gontard P.C.

(57) ABSTRACT

The invention is directed to mass spectrometer comprising an extraction system for secondary ions. The system comprises: an inner spherical deflecting sector; an outer spherical deflecting sector; a deflecting gap formed between the sectors; a housing in which the sectors are arranged. The deflecting sectors are biased at retarding potentials in order to reduce the energy of the ion beam entering the deflecting gap. The system further comprises an exit disc electrode which is biased at the midvoltage of the average voltage of the sectors, and two side plates both facing the spherical sectors, the side plates being biased in order to create an electrostatic field perpendicular to the exit axis.

32 Claims, 6 Drawing Sheets

(58) Field of Classification Search
USPC .............................. 250/396 R, 397, 281, 282
See application file for complete search history.

(56) References Cited

OTHER PUBLICATIONS

Schueler: "Microscope imaging by time-of-flight secondary ion mass spectrometry". Microscopy, Microanalysis, Microstructures 3 (1992) 119-139.
Aoki et al: Simulation of ion trajectories using the surface-charge method on a special purpose computer. Nuclear Instruments and Methods in Physics Research A 600 (2009) 466-470.

* cited by examiner

EXTRACTION SYSTEM FOR CHARGED SECONDARY PARTICLES FOR USE IN A MASS SPECTROMETER OR OTHER CHARGED PARTICLE DEVICE

CROSS-REFERENCE TO RELATED APPLICATIONS

The present invention is the US national stage under 35 U.S.C. § 371 of International Application No. PCT/EP2017/053658, which was filed on Feb. 17, 2017, and which claims the priority of application LU 92981 filed on Feb. 19, 2016, the content of which (text, drawings and claims) are incorporated here by reference in its entirety.

FIELD

The invention is directed to a charged particle deflecting device. Specifically, the invention concerns an extraction system for charged particles emitted from a surface. More specifically, the invention concerns an extraction system for charged secondary particles emitted from a surface under the bombardment of a beam of charged primary particles. Even more specifically, the invention concerns an ion extraction system for secondary ions emitted from a surface under the bombardment of a primary ion beam in a mass spectrometer. The invention also provides a mass spectrometer device.

BACKGROUND

Secondary ion mass spectrometry, also known under the acronym SIMS, is a widespread technique for the analysis of surfaces and small volumes. It is an extremely powerful technique, capable of very high sensitivity, high mass resolution and high depth resolution. It can be used to determine the elemental, molecular and isotopic composition of a sample. SIMS uses a focused beam of ions (primary ions) to sputter a material and produce a localized ion emission characteristic of the material itself (secondary ions). Typical ion beams used in SIMS are reactive primary ion beams ($Cs^+$, $O_2^+$, $O^-$) enhancing the emission of negative and positive secondary ions, respectively, and cluster ion beams ($Ar_n^+$, $C_{60}^+$, $Bi_n^+$, $Au_n^+$). While smaller Bi and Au clusters are mainly used for imaging applications, $C_{60}$ and large Ar clusters have been demonstrated to be of highest interest for organic depth profiling. The secondary ions emitted from the specimen are analyzed by mass spectrometry.

A secondary ion mass spectrometry device generally includes at least one device for producing and focusing primary ions and a device for collecting and measuring the secondary ions. The device for measuring the secondary ions generally includes an extraction system for secondary ions, transfer optics, a mass spectrometer and a detection system. Many different arrangements of the above elements exist and many different types of spectrometer (e.g. magnetic sector, time of flight, quadrupole, ion trap . . . ) may be used to perform SIMS. These are well known in the state of the art.

As the sensitivity of SIMS analysis is determined in part by the collection and transmission of secondary ions through the complete device, efficient extraction of the secondary ions is extremely important for all types of spectrometer.

The extraction fields required for collection of secondary ions can have a number of deleterious effects on the primary ion beam. The beam may be deflected changing both the position and angle of impact. And aberrations may be introduced, increasing the spot size of the primary beam decreasing the achievable lateral resolution. This last consideration is particularly important for imaging SIMS. One method of minimizing the aberrations introduced by the extraction field is to ensure that the primary and secondary ions beam are coaxial in the vicinity of the sample. One example of a SIMS instrument that uses this configuration is the Cameca NanoSIMS 50. However the precise arrangement used by the NanoSIMS imposes the limitation that the primary and secondary ions must be of opposite polarity. Thus negative primary ions must be used for the analysis of positive secondary ions and vice versa.

Prior art patent document published WO2014/108376 A1 discloses a mass spectrometer device for separating ions in accordance with their mass-to-charge ratio. The mass spectrometer device successively comprises an ion source, an electrostatic sector, a magnetic shunt, a magnetic sector and detection means. The magnetic sector achieves separation of ions originating from the source of ions according to their mass-to-charge ratios. The electrostatic sector comprises spherical electrodes which define between them a deflection gap. The electrostatic sector is used in retarding mode in order to reduce the energy of the ion beam entering the electrostatic sector. The combination of magnetic sector an electrostatic sector is used to provide an achromatic focusing of the secondary ions.

Prior art document of SCHUELER B: "Microscope imaging by time-of-flight secondary ion mass spectroscopy", MICROSCOPY, MICROANALYSIS, MICROSTRUCTURE, LES ULIS, FR, vol. 3, no. 2/3, 1 Apr. 1992 (1992-04-01), pages 119-138, XP002559196, ISSN: 1154-2799, DOI: 10.1051/MMM:0199200302-3011900; discloses a charged particle beam deflecting system providing a stigmatic image in the detection plane. The system includes several pairs of spherical sectors, each pair forming a spherical deflecting gap for a secondary beam. The system is also fitted with Herzog shunts and Matsuda plates. Such devices typically provide a potential closer to an ideal l/r potential in the deflecting gap. In this case, the devices are used to produce slightly toroidal field to specifically compensate for time of flight errors introduced in the accelerating region of the spectrometer.

SUMMARY

The invention has for object to overcome at least one of the disadvantages mentioned in the prior art. The invention also has for objective to improve the quality of the exit beam of an ion beam deflecting system. The invention also has for technical problem to reduce the focussing effect of a spherical electrostatic sector. The invention also aims at providing a substantially parallel beam at its exit. The invention also has for object to efficiently extract charged secondary particles while minimizing the deleterious effects of the extraction field on the primary beam to allow high lateral resolution analysis to be carried out. The invention also has for object improving the quality of the beam of secondary charged articles exiting the extraction system to allow more efficient transport of the secondary particles into subsequent optics. The invention also has for object being sufficiently compact to be used as an add-on to existing instrumentation.

The invention is also directed to a charged particle beam deflecting system, notably an extraction system for charged secondary particles in a charged particle device, the charged particle beam deflecting system comprising: an inner spherical sector; an outer spherical sector; an entry for the charged particle beam; an exit passageway with an exit axis through which a deflected charged particle beam leaves the housing;

a deflecting gap which is formed between the spherical sectors and which communicates with the entry and with the exit passageway; an exit wall electrode with an exit opening facing the deflecting gap, the exit wall electrode comprising an exit wall potential; the spherical sectors being biased at deflecting potentials in order to deflect the charged particle beam entering the deflecting gap by a given angle; wherein the system further comprises an intermediate electrode with a plate shape and with an exit through hole, the intermediate electrode being arranged between the deflecting gap and the exit wall electrode; and two side plates both facing the spherical sectors, the side plates being biased in order to create an electrostatic field perpendicular to the exit axis.

According to various embodiments, wherein the side plates are biased at a potential which is at least as high as the average potential of the spherical sectors, preferably at least at least twice times as high as the average potential of the spherical sectors, more preferably at least three times as high as the average potential of the spherical sectors even more preferably at least four times as high as the average potential of the spherical sectors.

According to various embodiments, each spherical sector exhibits lateral faces facing the side plates, each lateral face being mainly or totally covered by one of the side plates.

According to various embodiments, the spherical sectors are biased at a retarding voltage in order to reduce the energy of the charged particle beam in the deflecting gap.

According to various embodiments, the intermediate electrode is a first plate, the system further comprising a second plate with a through hole centred about the exit axis, the second plate facing the first plate.

According to various embodiments, the system comprises a housing in which the sectors are arranged, the housing forming the exit wall electrode.

According to various embodiments, the housing is biased at the exit wall potential.

According to various embodiments, the intermediate electrode is a disc electrode, the corresponding through hole being centered therein.

According to various embodiments, the intermediate electrode is quadrilateral, preferentially a rectangle electrode.

According to various embodiments, the housing surrounds the sectors and is at the ground potential, and/or the housing comprises a space with an electrostatic field which separates the sectors from the housing.

According to various embodiments, the housing comprises a lower wall intended to face a sample to be analyzed, the lower wall comprising a lower opening, and/or the housing comprises an upper wall with at least one upper opening, the openings being coaxial.

According to various embodiments, the outer sector comprises at least one channel coaxially arranged with the lower opening and with the upper opening.

According to various embodiments, the outer sector comprises several channels for several primary beams, and/or the upper wall comprises several upper openings for several primary beams.

According to various embodiments, the height of each through hole is substantially equal to the radial height RH of the deflecting gap.

According to various embodiments, each through hole is circular and comprises a diameter which is substantially equal to the radial height RH of the deflecting gap.

According to various embodiments, the thickness of the intermediate electrode is not more than the height of the corresponding through hole.

According to various embodiments, the deflecting gap substantially extends over a quarter circle, and/or forms a bend with an angle comprised between 60° and 120°, optionally it forms a 90° bend.

According to various embodiments, the side plates are each laterally disposed with respect to the sectors.

According to various embodiments, the system inner sector and/or the outer sector comprise a system with a mid-radius measuring at most 10 mm, preferably at most 8 mm.

According to various embodiments, the system comprises a fixation flange and/or fixation means, preferably reversible fixation means.

According to various embodiments, the deflected charged particle beam leaves the housing along the exit axis.

According to various embodiments, the housing is maintained at ground potential.

According to various embodiments, the housing comprises a pair of coaxial openings in the upper and lower walls to allow the passage of a primary beam.

According to various embodiments, the lower surface of the housing is arranged substantially parallel to the sample receiving plate.

According to various embodiments, the inner sector comprises an outer surface forming a portion of an inner sphere; and/or the outer sector comprises an inner surface forming a portion of an outer sphere which is concentric with the inner sphere. The space between the sectors forming a deflecting gap.

According to various embodiments, the inter-radial separation of the inner and outer sector is preferably between 1 mm and 4 mm, and more preferably 2 mm.

According to various embodiments, the outer sector comprises a channel to allow the passage of the primary beam, the channel being coaxially arranged with the opening formed in the housing.

According to various embodiments, the side plate electrodes are mounted substantially parallel to the sides of the inner and outer sectors.

According to various embodiments, the side plates are shaped to allow convenient passage of electrical and/or mechanical connections to the spherical sectors while ensuring that the deflecting gap between the spherical sectors is substantially covered.

According to various embodiments, the intermediate electrode comprises an exit through hole arranged in front of the deflecting gap.

According to various embodiments, the exit through hole has a cylindrical shape.

According to various embodiments, the exit through hole is arranged in order to be coaxial with the axis formed by the mid axis of the spherical sectors.

According to various embodiments, the intermediate electrode is arranged such that its upstream surface is substantially parallel to a plane formed by the exit surfaces of the inner and outer sectors.

According to various embodiments, the distance between the intermediate electrode and the plane formed by the exit surfaces of the sectors is not greater than the radial height RH of the deflecting gap or the inter radial separation of the sectors.

According to various embodiments, the diameter of the exit opening in the intermediate electrode is substantially equal to the inter-radial distance between the inner and outer sectors.

According to various embodiments, the intermediate electrode is substantially planar.

According to various embodiments, the intermediate electrode is annular with an outer radius 1-2 mm larger than the radius of the exit opening.

According to various embodiments, the device comprises means for biasing the inner and outer spherical sector electrodes, the plate electrodes and the intermediate electrode independently.

According to various embodiments, the device comprises means for biasing the sample in order to create an electric field between the sample and the lower surface of the housing for extracting charged secondary particles.

According to various embodiments, the intermediate electrode is annular with an outer radius at least 1 mm larger than the radius of the through hole, preferably at least 2 mm larger, more preferably at least 3 mm larger.

According to various embodiments, the inner diameter of at least one or of each through hole is smaller than the thickness of the corresponding plate.

According to various embodiments, at least one or each exit through hole is in front of the deflecting gap and/or is cylindrical.

According to various embodiments, the intermediate electrode faces each sector, notably in order to reduce the electric field between the electrode and the spherical sectors.

According to various embodiments, the system comprises means for biasing the spherical sectors; and/or the intermediate electrode; preferentially in an independent manner.

According to various embodiments, the intermediate electrode is inscribed in the exit opening.

According to various embodiments, the intermediate electrode is biased at an intermediate potential in order to deflect the charged particle beam inside the deflecting gap so as to render the charged particle beam parallel to the exit axis, and/or so as to align the charged particle beam with the exit axis, and/or so as to straighten the charged particle beam along the exit axis.

The invention is also directed to a charged particle beam deflecting system, notably an extraction system for charged secondary particles in a charged particle device, the charged particle beam deflecting system comprising: an inner spherical sector; an outer spherical sector; a housing in which the sectors are arranged, the housing comprising a housing potential; an entry for the charged particle beam; an exit passageway with an exit axis through which a deflected charged particle beam leaves the system; a deflecting gap which is formed between the spherical sectors and which communicates with the entry and with the exit passageway; the spherical sectors being biased at deflecting potentials in order to deflect the charged particle beam entering the deflecting gap by a given angle; wherein the system further comprises two side plates each laterally disposed with respect to the sectors; and an intermediate electrode with a plate shape and with an exit through hole centered about the exit axis, the intermediate electrode being downstream the spherical sectors, and the spherical sectors being biased at an intermediate potential between the potential of the intermediate electrode and the potential of the side plate, and/or the intermediate electrode is biased at an intermediate potential between the potential of the housing and the potential of the side plates.

The invention is directed to a charged particle beam deflecting system, notably an extraction system for charged secondary particles in a charged particle device, the charged particle beam deflecting system comprising: an inner spherical sector; an outer spherical sector; an entry for the charged particle beam; an exit passageway with an exit axis through which a deflected charged particle beam leaves the housing; a deflecting gap which is formed between the spherical and which communicates with the entry and with the exit passageway; an exit wall electrode with an exit opening facing the deflecting gap, the exit wall electrode comprising an exit wall potential; the spherical sectors being biased at deflecting potentials in order to deflect the charged particle beam entering the deflecting gap by a given angle; wherein the system further comprises an intermediate electrode with a plate shape and with an exit through hole centered about the exit axis, the intermediate electrode being downstream the spherical sectors, and the intermediate electrode is biased at an intermediate potential between the exit wall potential and the average potential of the spherical sectors.

The invention is also directed to a charged particle beam deflecting system, notably an extraction system for charged secondary particles in a charged particle device, the charged particle beam deflecting system comprising: an inner spherical sector; an outer spherical sector; an entry for the charged particle beam; an exit passageway with an exit axis through which a deflected charged particle beam leaves the housing; a deflecting gap which is formed between the spherical sectors and which communicates with the entry and with the exit passageway; an exit wall electrode with an exit opening facing the deflecting gap, the exit wall electrode comprising an exit wall potential; the spherical sectors being biased at retarding potentials in order to reduce the energy of the charged particle beam entering the deflecting gap; wherein the system further comprises an intermediate electrode with a plate shape and with an exit through hole which is between the exit opening and the deflecting gap; the intermediate electrode is biased at an intermediate potential between the exit wall potential and the potential of one of the spherical sectors.

According to various embodiments, the intermediate electrode is biased at an intermediate potential between the exit wall potential and the average potential of the spherical sectors.

According to various embodiments, the intermediate electrode is biased at an intermediate potential between the exit wall potential and the potential of one of the spherical sectors whose potential is the nearest from the exit wall potential.

The invention is also directed to a charged particle beam deflecting system, notably an extraction system for charged secondary particles in a charged particle device, the charged particle beam deflecting system comprising: an inner spherical sector; an outer spherical sector; an entry for the charged particle beam; an exit passageway with an exit axis through which a deflected charged particle beam leaves the housing; a deflecting gap which is formed between the spherical sectors and which communicates with the entry and with the exit passageway; an exit wall electrode with an exit opening facing the deflecting gap, the exit wall electrode comprising an exit wall potential; the spherical sectors being biased at deflecting potentials in order to deflect the charged particle beam entering the deflecting gap by a given angle; wherein the system further comprises an intermediate electrode with an exit through hole in the projection of the exit opening toward the deflecting gap; and two side plates laterally disposed with respect to the spherical sectors, the spherical sectors being biased at an intermediate potential between the potential of the intermediate electrode and the potential of the side plate, and/or the intermediate electrode is biased at an intermediate potential between the potential of the exit wall electrode and the potential of the side plates.

The invention is also directed to a charged particle beam device comprising a charged particle deflecting system, notably a secondary particle deflecting system, characterized in that the charged particle deflecting system is in accordance with the invention, preferably the housing forms an extraction electrode.

According to various embodiments, the device is a mass spectrometer for analyzing secondary ions.

According to various embodiments, the device comprises along the exit axis, and from the charged particle deflecting system: an acceleration stage, a first lens, a system of deflectors, and a second lens, or any combination thereof.

According to various embodiments, the device further comprises a magnetic sector and a detection system.

According to various embodiments, the device comprises a source of primary particles for generating the secondary charged particle from a sample, the primary particles being ions and the secondary charged particles being ions.

According to various embodiments, the device comprises a source of primary particles for generating the secondary charged particle from a sample, the primary particles being ions and the secondary charged particles being electrons.

According to various embodiments, the device comprises a source of primary particles for generating the secondary charged particle from a sample, the primary particles being electrons and the secondary charged particles being electrons.

According to various embodiments, the device comprises a source of primary particles for generating the secondary charged particle from a sample, the primary particles being electrons and the secondary charged particles being ions.

According to various embodiments, the device comprises a primary beam source for forming secondary charged particles, the primary beam being a photon beam, or x-ray beam, or a fast neutral beam.

According to various embodiments, the device further comprises a sample area below the housing; the source of primary charged particles being above the housing, and the device being arranged such that the primary charged particles reach the sample area through the housing.

According to various embodiments, the device comprises a support assembly with means for setting the position of the extraction system in the longitudinal and/or transversal stage, in order align the optical axis with the axis of the primary beam.

According to various embodiments, the device comprises means for biasing the sample in order to create a detection system.

The invention is also directed to a gas flooding system comprising a charged particle deflecting system, wherein the charged particle deflecting system is in accordance with the invention.

Each object of the invention can be combined with the other objects of the invention, and each preferred embodiment of one object of the invention may be combined with the other objects of the invention.

The invention is particularly interesting in that the primary beam axis becomes substantially coaxial with the secondary beam and substantially normal to the sample in the vicinity of the sample. This reduces the deflection of and aberrations introduced into the primary beam by the extraction field. The secondary particles are separated from the primary particles by exploiting the substantial energy difference between the two beams. A pair of concentric spherical sectors deviates the secondary particles by an angle such that they can be conveniently introduced into other charged particle optical systems. Such systems including mass spectrometer devices. By retarding the secondary particles in the vicinity of the spherical sectors to a substantially lower voltage than the extraction voltage, the required deflecting voltage on the spherical sectors is reduced, further reducing the aberrations introduced in the primary beam while not substantially reducing the transmission of the secondary beam. The combination of the side plate electrodes and the intermediate electrode work in conjunction with the spherical sector electrodes to maximize the transmission of secondary particles through the extraction system and to produce a beam of higher optical quality for injection into subsequent charged particle devices.

The extraction system according to the invention could equally well be used in systems where the primary beam comprises electrons or ions, and the secondary beam also comprises ions or electrons. Then the invention provides four possible usage scenarios.

The secondary ion beam becomes substantially parallel to the exit axis of the ion beam deflecting system. This effect persists even when the side plates are biased to a given electric potential. Using the features of the invention, the intermediate electrodes are able to reduce or to cancel the focussing effect that occurs due to the spherical sectors. The focussing effect can be corrected even when the y focus and the z focus are spaced apart along the x axis, or exit axis.

The intermediate electrode is biased at a reduced voltage with respect to the spherical sectors. The invention affords to apply a reduced sample voltage, 250 V or 500 V by way of example. By applying a sector voltage corresponding to 80% of the sample voltage, a spot size of 20 nm can be produced. 10 nm spots have been obtained in practice. The deflection of the primary beam can be kept below 10 μm. In such conditions, the sample voltage does not spread out the primary ion. Voltages from 0 V to 1000 V have been studied with interesting results. Voltages up to 4000 V are also considered.

The table 1 represents the variation of transmission, the primary beam deflection, and spot size with sample and spherical voltage.

TABLE 1

| Sample voltage (V) | Sector voltage (% of sample voltage) | Transmission (%) | Beam deflection (μm) | Spot size (nm) |
| --- | --- | --- | --- | --- |
| 250 | 80 | 9.5 | 4.5 | 10 |
| 500 | 0 | 40 | 38 | 450 |
|  | 20 | 34 | 30 | 330 |
|  | 40 | 32 | 23 | 207 |
|  | 60 | 30 | 16 | 104 |
|  | 80 | 21 | 9 | 20 |

The invention is also adapted for a compact SIMS spectrometer design. It can be implemented in a known apparatus, like a helium ion microscope or dual beam/cross beam. The mass spectrometer in accordance with the invention can be implemented in an existing microscope as an add-on. This advantage provides a significant cost reduction.

DRAWINGS

DETAILED DESCRIPTION

Figure 1:
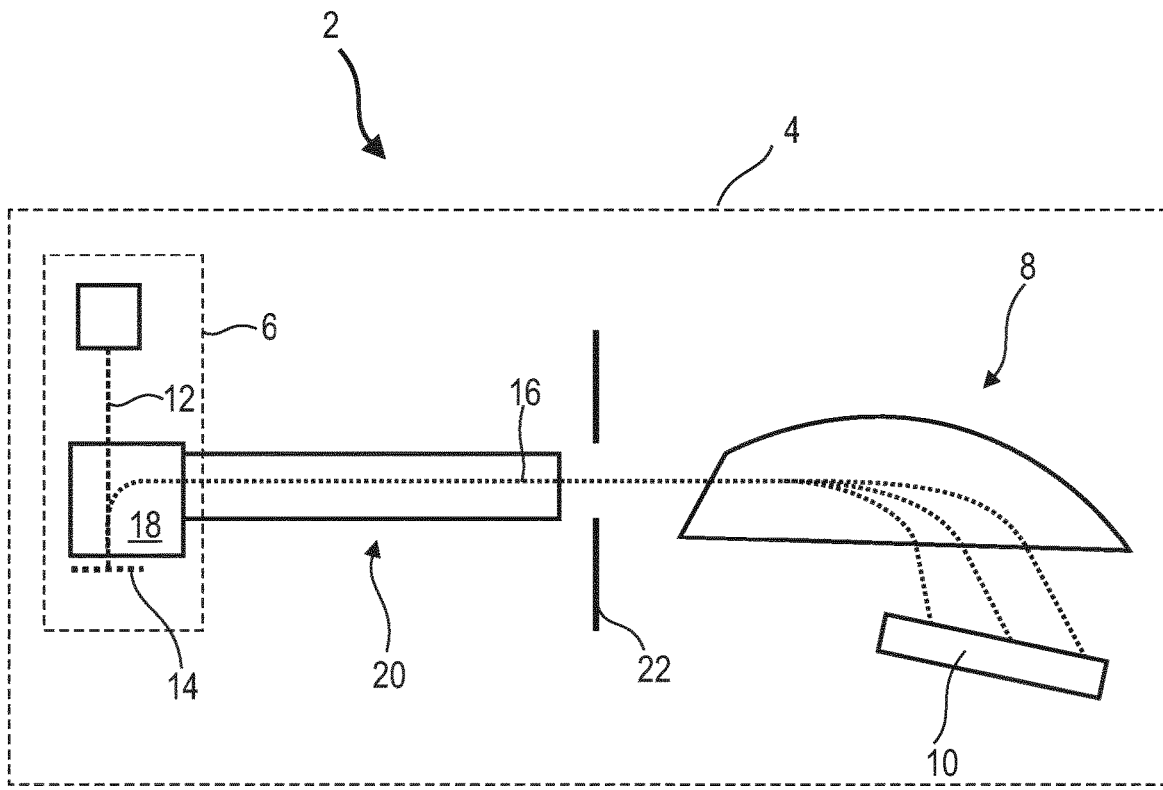
FIG. 1 is a schematic illustration of a mass spectrometer according to various embodiments of the invention.

This section describes the invention in further details based on various exemplary embodiments and on the figures. Similar reference numbers will be used to denote similar concepts across different embodiments of the invention. For example, reference numerals 18, 118 and 218 will be used to denote an ion beam deflection device according to the present invention in three different embodiments. Features described in detail for a given embodiment can be readily combined with the features of the other embodiments, unless the contrary is explicitly stated.

FIG. 1 gives a schematic illustration of a charged particle device 2 according to the present invention. The device can be a spectrometer device 2.

The device 2 provides an enclosure 4 having an inlet (not shown) for introducing a sample that is to be analyzed by the technique of mass spectrometry. The enclosure 4 encompasses a vacuum and comprises an ion source 6, a magnetic sector 8 and at least one detector 10, optionally two or more detectors. Throughout this description, the word detector will be used to denote a device that is capable of detecting and quantifying ions of different mass-to-charge ratios, to compute the resulting spectrum and to display the resulting spectrum. Such devices or device assemblies are well known in the art. The shape of the magnetic sector 8 can differ from the illustrated shape of the magnetic sector 8. The magnetic sector 8 can be the magnetic sector disclosed in the patent application WO2014108375 A1.

The ion source 6, or source of ions, comprises a source of primary ions forming a primary beam 12. It can comprise $He^+$ or $Ne^+$ or $Ga^+$ or $Xe^+$ or $N^+$ or $H^+$ or $O_2^+$ ions, bombarding the sample 14 in order to create secondary ions issued from the sample. Many other primary ion species could also be used. These are well known in the art. After their creation, the secondary ions are extracted from the sample 14 in the form of a secondary ion beam 16 by means of an extraction system 18. The latter can be an ion beam deflecting system 18.

The mass spectrometer device 2 can also comprise transfer optics 20 downstream of the ion source 6 and/or the extraction system 18. It can additionally comprise a device for analyzing the secondary ions according to their mass to charge ratios. Such devices can be, but are not limited to, magnetic sector 8 spectrometers, time of flight mass spectrometers or quadrupole mass spectrometers. A magnetic shunt 22 can be placed in the drift space between the transfer optics and the device for analyzing the secondary ions.

The secondary ion beam 16 hits the entrance plane of the magnetic sector 8 at an angle after having passed through the drift space between the ion source 6 and the entrance plane. The magnetic sector 8 generates a permanent magnetic field, which causes the secondary ions to follow specifically curved trajectories, depending on their specific mass-to-charge ratios. The transfer optics 20 can comprise an acceleration stage (not represented). The acceleration stage can comprise a set of biased sheets creating an acceleration field. The addition of an acceleration stage allows the secondary beam to be injected into the magnetic sector at fixed energy independent of the extraction voltage. An aperture at the exit of the acceleration stage is crossed by the ion beam. It also defines the solid angle of acceptance of the spectrometer and thus the transmission.

Downstream with respect of the drifting direction of the secondary ions, the transfer optics 20 can successively comprise a first lens, a double deflection, and a second lens. Each of them can be biased in order to create electrostatic fields acting on the secondary charged particles.

Figure 2:
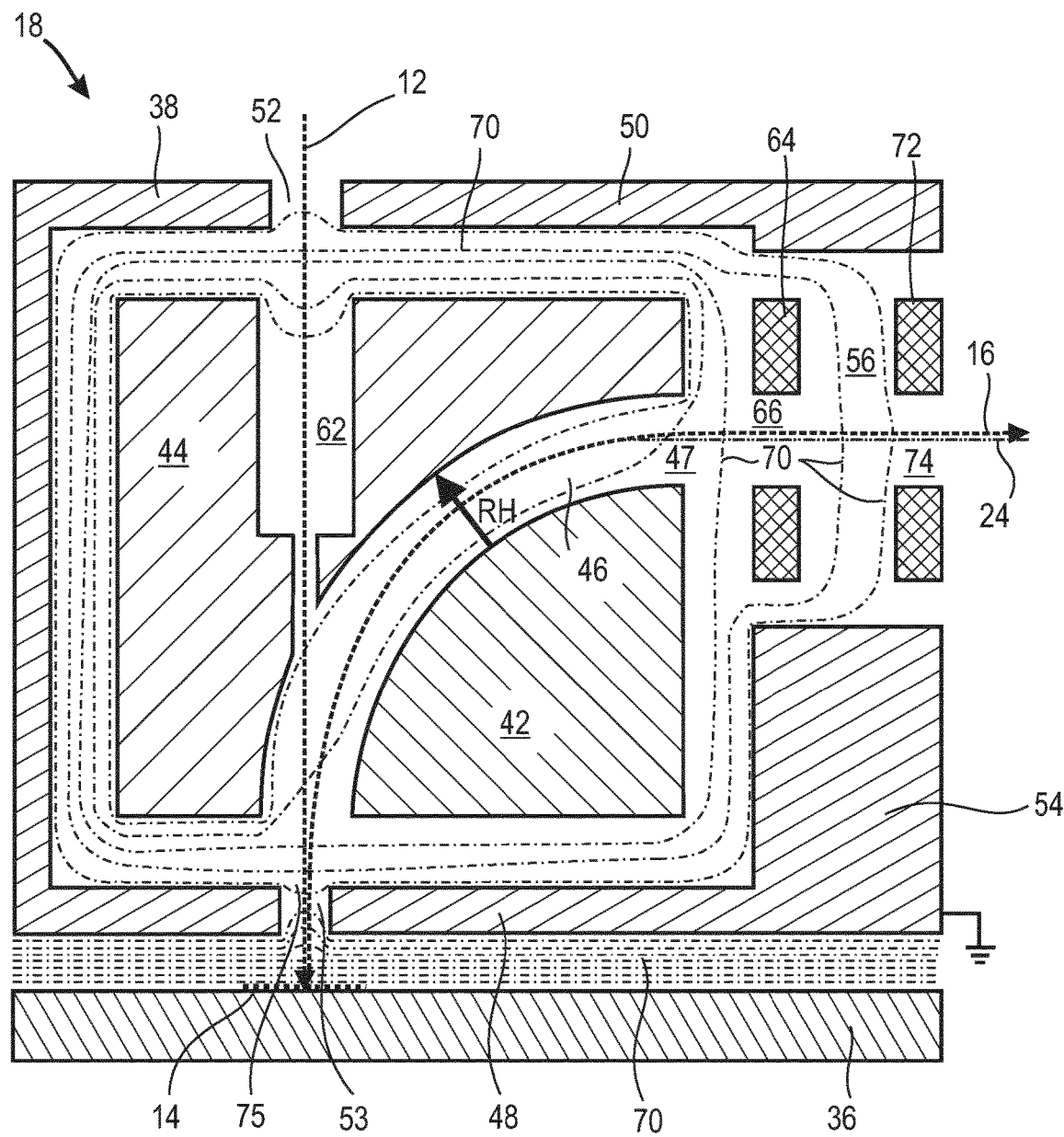
FIG. 2 is a sectional view of the charged particle beam deflecting system according to a first exemplary embodiment of the invention.

FIG. 2 represents a sectional view of the charged particle beam deflecting system 18 according to a first exemplary embodiment of the invention. The sectional view is taken along the exit axis 24.

The intermediate electrode 64 is a first plate 64. The ion beam deflecting system comprises a second plate 72 which can be part of the housing. It can be biased at the housing potential. This second plate 72 can show an identical shape as the first plate 64. For instance, it can also comprise a disc shape or a rectangular shape. It can exhibit a through hole 74 coaxially arranged with respect of the exit axis 24. The inner diameter of the through holes 66; 74 can be equal to the radial height RH of the deflecting gap 46. The latter communicates with the entry 75 and with the exit passageway 74 in order to provide a path for the secondary ion beam 16.

The housing 38 comprises an exit wall 54 where an exit opening 56 is arranged. The intermediate electrode 64 is enclosed in the exit opening 56. Then, it can be within the thickness of the exit wall 54. The same can apply to the second plate 72.

As it is apparent from FIG. 2, the electrostatic field between the deflecting gap 46 and the first electrode 64 is somewhat homogeneous. The field lines 70 are straight there. The electrostatic field decreases more progressively from the sectors 42; 44 toward the system's environment. This peculiarity corrects the secondary beam, which in turn becomes more parallel to the exit axis 24. Such a beam is easier to exploit for running composition analysis.

The primary beam 12 crosses the housing 38. It crosses the upper opening 52 formed in the upper wall 52, then goes through the upper sector 44 by projecting through its channel 62, and reaches the sample 14 by crossing the lower opening 53 of the lower wall 48. Advantageously, the upper opening 52, the lower opening 48 and the channel 62 are coaxial.

Field lines 70 are drawn between the plate receiving sample 36 and the housing 38. Other field lines 70 extend around the sectors 42; 44, through the deflection gap 46. Some of these field lines 70 also wrap around the intermediate electrode 64. The field lines 70 are schematic, and can correspond there to the retarding voltage. The lines arrangement can differ when other voltages are applied to the sectors 42; 44 and to the housing 38. As we can notice, the field lines are more curved between the upper opening 52 and the channel 62 than in the vicinity of the intermediate electrode 64.

Figure 3:
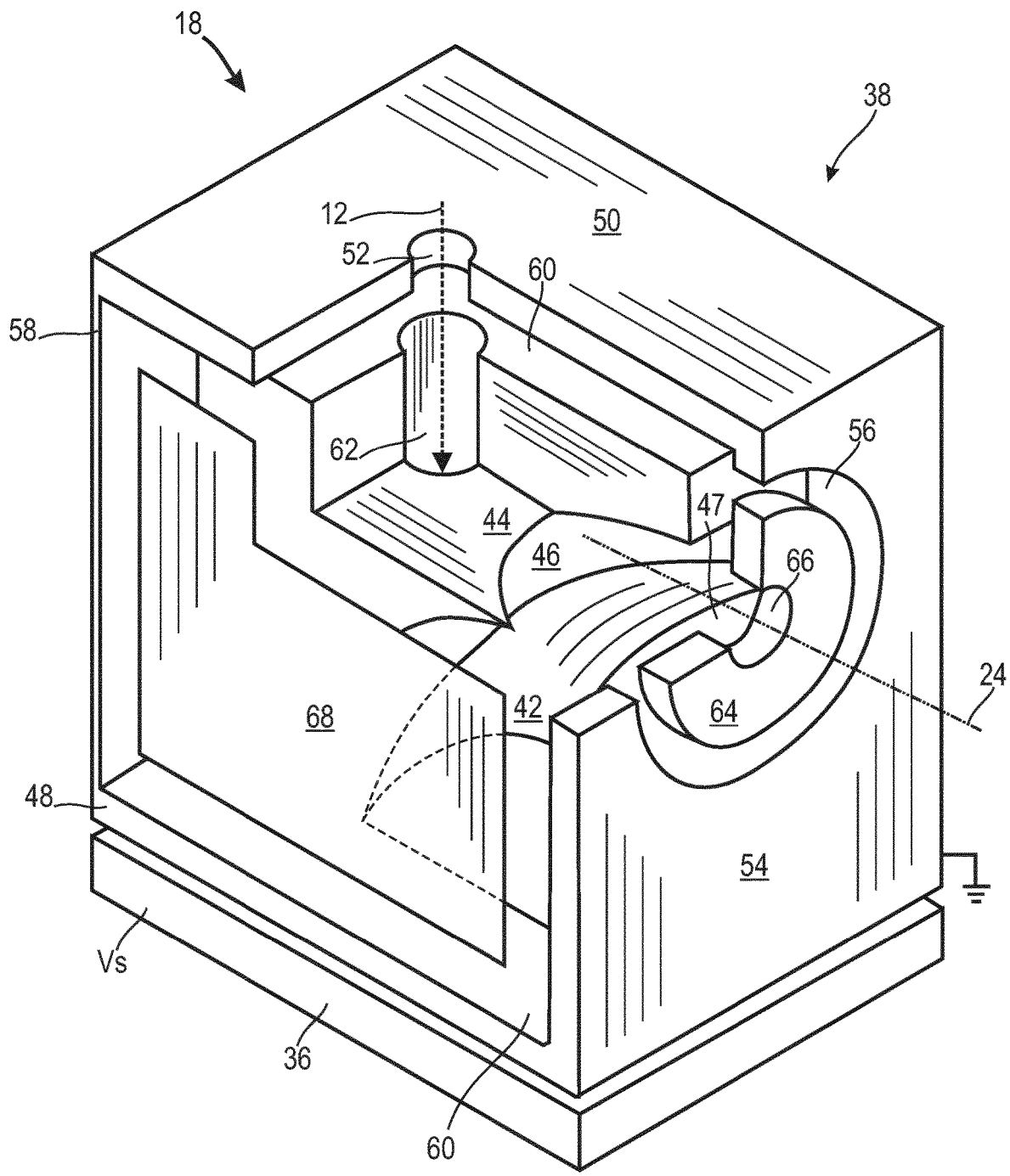
FIG. 3 illustrates a perspective view of the charged particle beam deflecting system according to the first exemplary embodiment of the invention.

FIG. 3 represents an isometric view of the charged particle beam deflecting system 18 according to the first exemplary embodiment of the invention. A cut-out is performed therein in order to present more details. A slice of the exit wall is removed for a better exposure of the intermediate electrode 64.

The system 18 can comprise a sample area adapted for receiving a sample to be analyzed by the mass spectrometry technique. The sample area can be formed as a sample receiving plate 36. The plate 36 is biased at a sample voltage Vsa, which can be comprised between 50 V and 500 V.

The system 18 comprises a housing 38, also designated as a shield. The housing 38 can form an extraction electrode. It has a housing potential, for instance the ground potential. The voltage difference between the housing 38 and the sample receiving plate 36 generates an electrostatic field therebetween. The electrostatic field accelerates the secondary ions upwards from the sample receiving plate 36.

The housing 38 defines a cavity wherein an inner sector 42 and an outer sector 44 are arranged. The inner sector 42 comprises an outer convex surface forming a portion of an inner sphere; and the outer sector 44 comprises an inner concave surface forming a portion of an outer sphere which is concentric with the inner sphere. The sectors 42; 44 define between them a deflecting gap 46, which deflects the secondary beam toward the exit axis 24. The system 18 can comprise an entry and an exit passageway 47, which both communicate with the deflecting gap 46. The arrangement enables the passage of the ion beam through the deflecting gap 46 and through the housing 38.

The deflecting gap 46 bends the secondary beam of 90°. However, it can bend the secondary beam of an angle comprised between 30° and 120°. For this purpose, the sectors 42; 44 are biased at different potentials. More precisely, the sectors 42; 44 are biased at retarding potentials, or retarding voltages Vr, in order to reduce the energy of the secondary ions entering the deflecting gap 46. The sector voltages Vse are given in the following formulae Vse=Vr+/−Vd, wherein Vd is adapted for ensuring the deflection. It depends on the energy of the entering primary ions E1, which is equal to sample voltage Vsa; optionally reduced by the retarding potential Vr. It also depends on the radius of the sectors.

Reducing the energy of the secondary ion beam enables to reduce the potential difference between the sectors 42; 44. This lowers the influence on the primary ion beam 12, allowing for analysis with higher lateral resolution.

The housing 38 comprises a lower wall 48 with a lower opening (here hidden), an upper wall 50 with an upper opening 52 which is crossed by the primary ion beam 12. The lower wall 48 and the upper wall 50 are joined by an exit wall 54 which comprises an exit opening 56 around the exit axis 24. The lower wall 48 can be substantially parallel to the sample receiving plate 36. The upper wall 50 and the lower wall 48 are optionally joined by a rear wall 58. The housing 38, notably by means of its walls 48; 50; 54; 58, surrounds the sectors 42; 44. It can form a closed loop enclosing the sectors 42; 44, and optionally a separating space 60 around the sectors 42; 44. An electrostatic field exists in the separating space 60 due to the potential difference between the housing 38 and each of the sectors 42; 44.

The upper sector 44 comprises a channel 62 aligned with the upper opening 52 and with the lower opening. It enables the passage of the primary ion beam 12 toward the sample by shedding in the deflection gap 46.

An intermediate electrode 64 is arranged in the exit opening 56. It exhibits a plate shape. It can for example be disk shaped. It is integrally formed, flat, of constant thickness. It can be substantially thin. Its thickness is less than the half of its width, in various instances less than 25%. Only an angular portion of the intermediate electrode 64 is represented due to the cut out representation; however in practice it forms a closed loop around the exit axis 24. The intermediate electrode 64 comprises a through hole 66. It can be centered about the exit axis 24, and can be in the extension of the deflecting gap 46. The through hole 66 is advantageously circular and centered about the exit axis 24.

In order to improve the transmission of the ion beam deflecting system 18, it can comprise two side plates 68, only one of which is described there. They are biased to an electric potential by biasing means. Their potential can be raised up to 2000 V for instance. They are laterally disposed to the sectors (42; 44), and can be arranged in the cavity of the housing 38. The lateral direction is understood horizontally and perpendicularly to the exit axis 24. The side plates 68 are disposed in parallel, and perpendicular to the sample plate 36.

Figure 4:
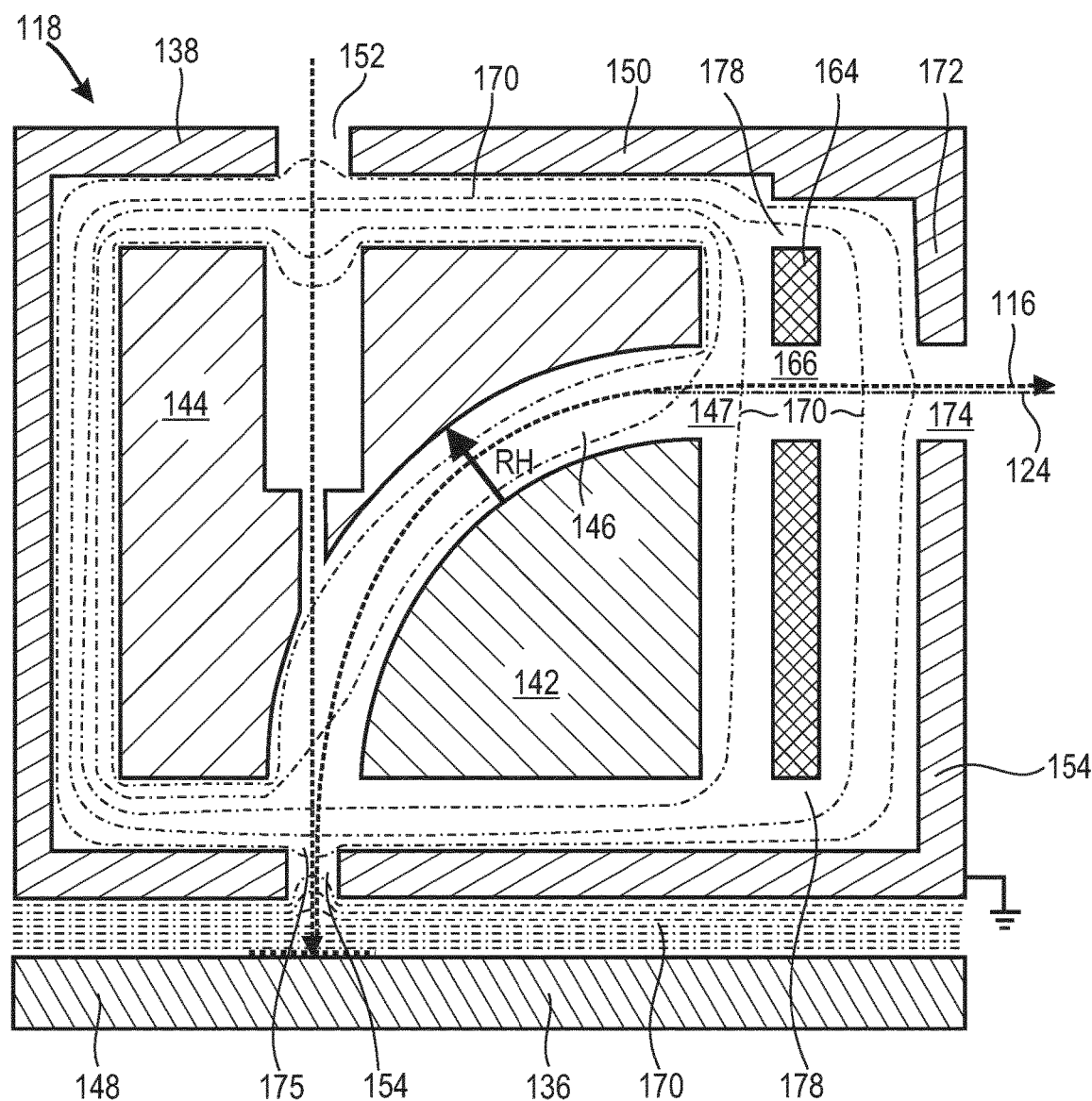
FIG. 4 is a sectional view of the charged particle beam deflecting system according to a second exemplary embodiment of the invention.

FIG. 4 represents a sectional view of the charged particle beam deflecting system 118 according to the second embodiment of the invention. The sectional view is taken along the exit axis 124.

The ion beam deflecting system 118 of a second exemplary embodiment is similar to the first exemplary embodiment; however it substantially differs in that the intermediate electrode 164 is a rectangular electrode outside the through hole 174 of the exit wall 154.

The intermediate electrode 164 extends over the majority of the height of the housing 138. It projects over the whole height of the spherical sectors 142; 144. Its circular exit through hole 166 is centered about the exit axis 124. The intermediate electrode 164 is not limited to a rectangular shape, it can be square or more generally a quadrilateral. A space 178 separates the edges of the intermediate electrode 164 from the inner surface or wall 150; 148 of the housing 138. The intermediate electrode 164 is substantially parallel to the exit wall 154, but remote therefrom.

Figure 5:
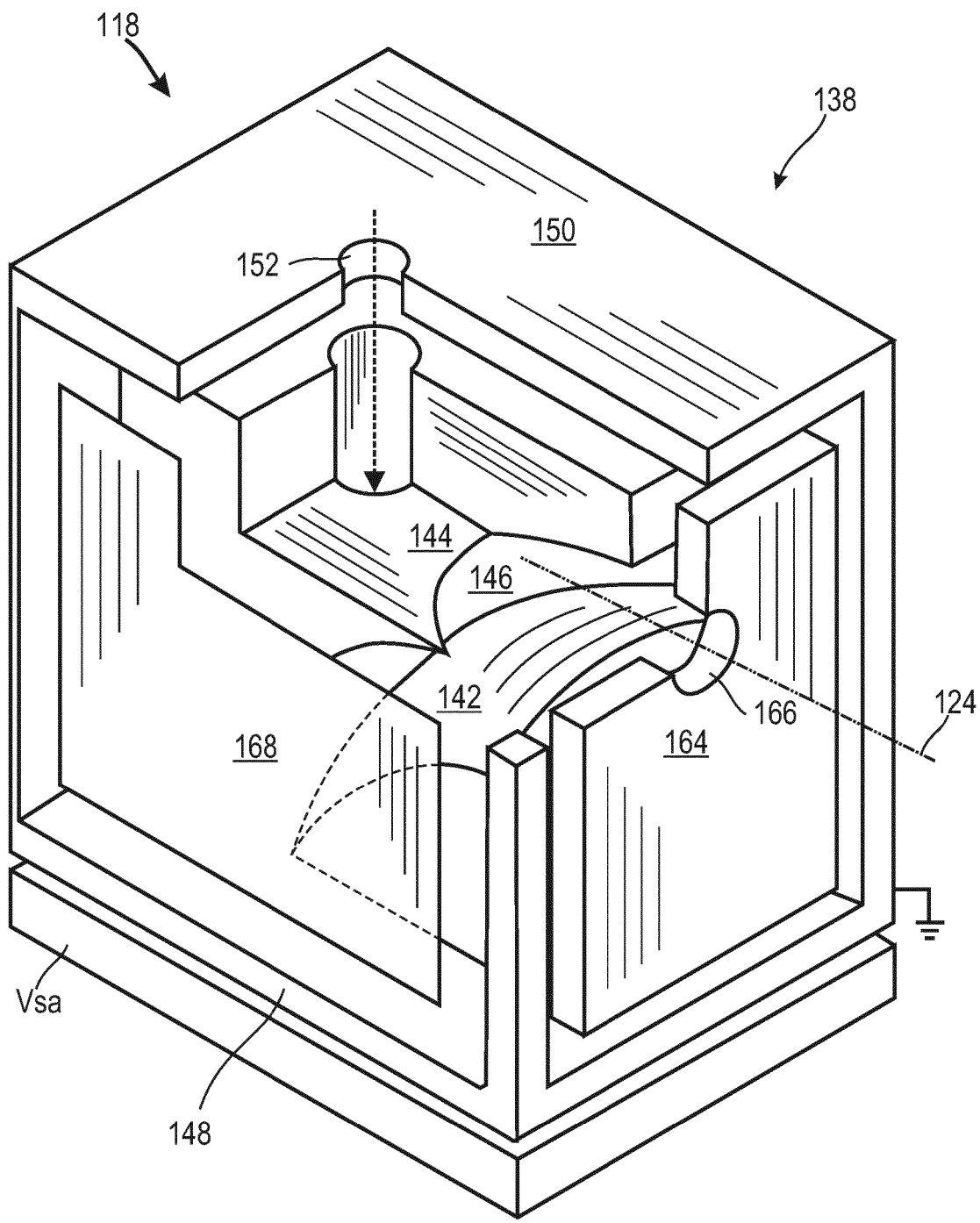
FIG. 5 illustrates a perspective view of the charged particle beam deflecting system according to the second exemplary embodiment of the invention.

FIG. 5 represents an isometric view of the charged particle beam deflecting system 118 according to the second exemplary embodiment of the invention. A cut-out is performed therein in order to expose more details. The exit wall of the housing has been removed in order to provide a better view of the spherical sectors 142, 146, and of the deflecting gap 146.

The intermediate electrode 164 is substantially centered between the upper wall 150 and the lower wall 148 of the housing 138. It can also be arranged between the side plates 168. The cylindrical through hole 166 of the intermediate electrode 164 is coaxially disposed with the exit axis 124. The intermediate electrode 164 forms an auxiliary bulkhead in the housing 138, and generally divides its inner space where the spherical sectors 142; 144 lie.

Figure 6:
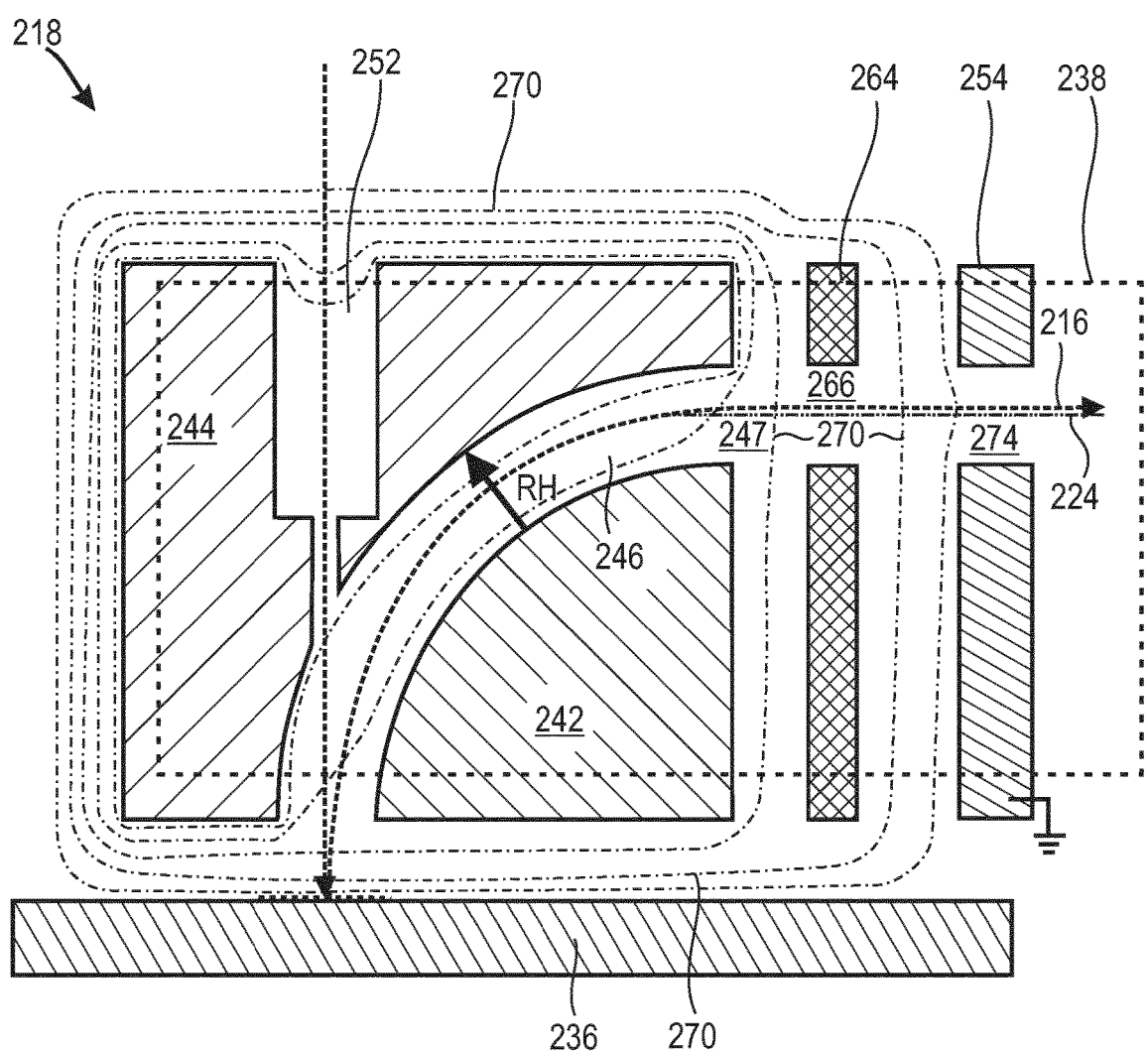
FIG. 6 is a sectional view of the charged particle beam deflecting system according to a third embodiment of the invention.

FIG. 6 represents a sectional view of the charged particle beam deflecting system 218 according to a third exemplary embodiment of the invention. The sectional view is taken along the exit axis 224.

The ion beam deflecting system 218 of the third exemplary embodiment is similar to the second exemplary embodiment in that the intermediate electrode 264, the spherical sectors (242; 244), the sample plate 236 remain similar. It differs in the previous housing is adapted. The exit wall 254 is kept, whereas the upper wall and lower wall are removed. They are replaced by the outer electrode 244 and the inner electrode 242 respectively. Their upper and lower faces can form these of the system. The exit wall 254 can be biased, or kept at the ground potential.

Here, the housing 238 is made of ceramic. In such a way, it can electrically isolate the spherical sectors 242; 244, the intermediate electrode 264 and the exit wall 254 from each other. The housing 238 can comprise a lateral portion where each spherical sector 242; 244 is fixed. It can form the main fixation bracket. The housing 238 can project downstream the exit wall 254.

The charged particle beam deflecting system 218 can comprise two side plates (not represented). The side plates are biased in order to create an electrostatic field perpendicular to the exit axis 224. They can be arranged within the housing 238, in face of each spherical sectors 242; 244. They can cover the deflecting gap 246, such as the housing 238 does. They can form a bridge joining the spherical sectors 242; 244.

Figure 7:
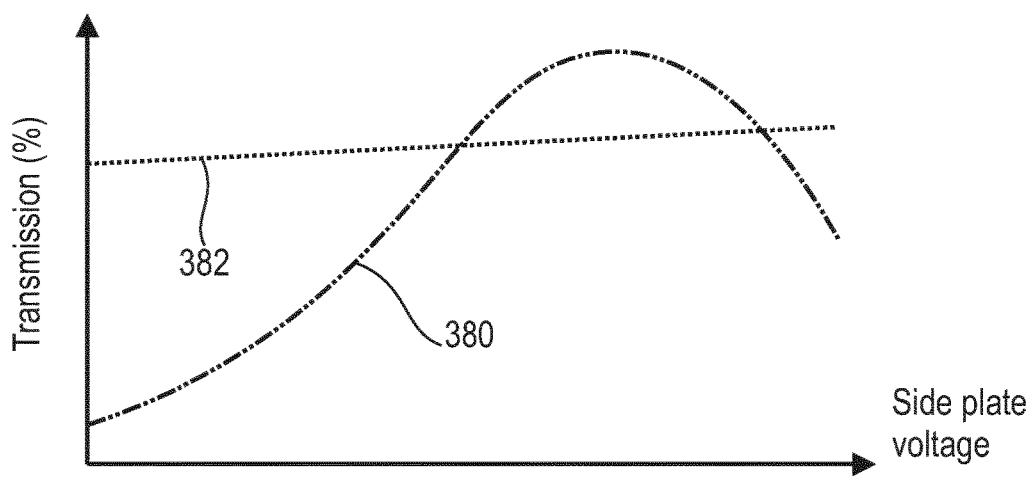
FIG. 7 is a plot showing simulated data obtained using an exemplary embodiment of the device according to the present invention.

FIG. 7 shows the variation in transmission of the extraction systems only with the side plates (plotted by means of a curved line 380), and with the side plates combined with the intermediate electrodes (plotted by means of a straight line 382).

Using the side plates on their own it is possible to obtain enhanced transmission over a certain voltage window. By correct tuning of the exit corrector and the side plates an enhanced transmission can be achieved over a wider range of voltages.

Example voltages for the extraction system.

The following voltages are illustrative. Each should be tuned individually to optimize the quality of the analysis. In both cases the secondary ion energy is reduced in the vicinity of the spherical sectors to 20% of the sample voltage. This reduces the deflection voltage required to deflect the ions by 90 deg in turn reducing the aberrations introduced into the primary beam. The extraction system can also be used in such a way that the energy of the secondary ions is not reduced in the vicinity of the spherical sectors. In this case a larger deflection voltage must be applied to the spherical sectors.

| Sample at 500 V | |
| --- | --- |
| Inner sphere | 375 V |
| Outer sphere | 425 V |
| Exit corrector | 250 V |
| Side plates | 1750 V |

| Sample at 250 V | |
| --- | --- |
| Inner sphere | 187.5 V |
| Outer sphere | 212.5 V |
| Exit corrector | 125 V |
| Side plates | 875 V |

The previous example can provide transmission of 40%.

The invention claimed is:

1. A charged particle beam deflecting system, the charged particle beam deflecting system comprising:
    an inner spherical sector;
    an outer spherical sector;
    an entry for the charged particle beam;
    an exit passageway with an exit axis through which a deflected charged particle beam leaves the system;
    a deflecting gap which is formed between the spherical sectors and which communicates with the entry and with the exit passageway;
    an exit wall electrode with an exit opening facing the deflecting gap, the exit wall electrode comprising an exit wall potential;
    the spherical sectors being biased at deflecting potentials in order to deflect the charged particle beam entering the deflecting gap by a given angle;
    wherein the system further comprises:
    an intermediate electrode with a plate shape and with an exit through hole, the intermediate electrode being arranged between the deflecting gap and the exit wall electrode; and
    two side plates both facing the spherical sectors, the side plates being biased in order to create an electrostatic field perpendicular to the exit axis.

2. The system in accordance with claim 1, wherein the side plates are biased at a potential which is at least as high as the average potential of the spherical sectors.

3. The system in accordance with claim 1, wherein each spherical sector exhibits lateral faces facing the side plates, each lateral face being one of mainly or totally covered by one of the side plates.

4. The system in accordance with claim 1, wherein the spherical sectors are biased at a retarding voltage in order to reduce the energy of the charged particle beam in the deflecting gap.

5. The system in accordance with claim 1, wherein the intermediate electrode is a first plate, the system further comprising a second plate with a through hole centered about the exit axis, the second plate facing the first plate.

6. The system in accordance with claim 1, further comprising a housing in which the sectors are arranged, the housing forming the exit wall electrode.

7. The system in accordance with claim 6, wherein the housing is biased at the exit wall potential.

8. The system in accordance with claim 1, wherein the intermediate electrode is a disc electrode, the corresponding through hole being centered therein.

9. The system in accordance with claim 1, wherein the intermediate electrode is quadrilateral.

10. The system in accordance with claim 1, wherein the housing surrounds the sectors and is at the ground potential, and/or the housing comprises a space with an electrostatic field which separates the sectors from the housing.

11. The system in accordance with claim 1, wherein at least one of the housing comprises a lower wall intended to face a sample to be analyzed, the lower wall comprising a lower opening, and the housing comprises an upper wall with at least one upper opening, the openings being coaxial.

12. The system in accordance with claim 1, wherein the outer sector comprises at least one channel coaxially arranged with the lower opening and with the upper opening.

13. The system in accordance with claim 12, wherein at least one of the outer sector comprises several channels for several primary beams, and the upper wall comprises several upper opening for several primary beams.

14. The system in accordance with claim 1, wherein the height of each through hole is substantially equal to the radial height RH of the deflecting gap.

15. The system in accordance with claim 1, wherein each through hole is circular and comprises a diameter which is substantially equal to the radial height RH of the deflecting gap.

16. The system in accordance with claim 1, wherein the thickness of the intermediate electrode is not more than the height of the corresponding through hole.

17. The system in accordance with claim 1, wherein the deflecting gap at least one of substantially extends over a quarter circle, and forms at least one of a bend with an angle comprised of between 60° and 120°, and a bend with an angle of 90°.

18. The system in accordance with claim 1, wherein at least one of the inner sector and the outer sector comprise a system with a mid-radius measuring at most 10 mm.

19. The system in accordance with claim 1 further comprising at least one of a fixation flange and a fixation element.

20. The system in accordance with claim 1, wherein the intermediate electrode is biased at an intermediate potential in order to deflect the charged particle beam inside the deflecting gap so as to render the charged particle beam parallel to the exit axis.

21. A charged particle beam device comprising a charged particle beam deflecting system, the charged particle beam deflecting system comprising:
an inner spherical sector;
an outer spherical sector;
an entry for the charged particle beam;
an exit passageway with an exit axis through which a deflected charged particle beam leaves the system;
a deflecting gap which is formed between the spherical sectors and which communicates with the entry and with the exit passageway;
an exit wall electrode with an exit opening facing the deflecting gap, the exit wall electrode comprising an exit wall potential;
the spherical sectors being biased at deflecting potentials in order to deflect the charged particle beam entering the deflecting gap by a given angle;
wherein the system further comprises:
an intermediate electrode with a plate shape and with an exit through hole, the intermediate electrode being arranged between the deflecting gap and the exit wall electrode; and two side plates both facing the spherical sectors, the side plates being biased in order to create an electrostatic field perpendicular to the exit axis.

22. The device in accordance with claim 21, wherein the device is a mass spectrometer for analyzing secondary ions.

23. The device in accordance with claim 21 further comprising along the exit axis, and from the charged particle deflecting system: at least one of an acceleration stage, a first lens, a system of deflectors, and a second lens.

24. The device in accordance with claim 21 further comprising a magnetic sector and a detection system.

25. The device in accordance with claim 21 further comprising a source of primary particles for generating the secondary charged particle from a sample, the primary particles being ions and the secondary charged particles being ions.

26. The device in accordance with claim 21 further comprising a source of primary particles for generating the secondary charged particle from a sample, the primary particles being ions and the secondary charged particles being electrons.

27. The device in accordance with claim 21 further comprising a source of primary particles for generating the secondary charged particle from a sample, the primary particles being electrons and the secondary charged particles being electrons.

28. The device in accordance with claim 21 further comprising a source of primary particles for generating the secondary charged particle from a sample, the primary particles being electrons and the secondary charged particles being ions.

29. The device in accordance with claim 21 further comprising a primary beam source for forming secondary charged particles, the primary beam being one of a photon beam, an x-ray beam, or a fast neutral beam.

30. The device in accordance with claim 25 further comprising a sample area below the housing; the source of primary charged particles being above the housing, and the device being arranged such that the primary charged particles reach the sample area through the housing.

31. The device in accordance with claim 21 further comprising a support assembly with element for setting the position of the extraction system in the longitudinal and/or transversal stage, in order align the optical axis with the axis of the primary beam.

32. A gas flooding system comprising a charged particle beam deflecting system the, charged particle beam deflecting system comprising:
an inner spherical sector;
an outer spherical sector;
an entry for the charged particle beam;
an exit passageway with an exit axis through which a deflected charged particle beam leaves the system;
a deflecting gap which is formed between the spherical sectors and which communicates with the entry and with the exit passageway;
an exit wall electrode with an exit opening facing the deflecting gap, the exit wall electrode comprising an exit wall potential;
the spherical sectors being biased at deflecting potentials in order to deflect the charged particle beam entering the deflecting gap by a given angle;
wherein the system further comprises:
an intermediate electrode with a plate shape and with an exit through hole, the intermediate electrode being arranged between the deflecting gap and the exit wall electrode; and
two side plates both facing the spherical sectors, the side plates being biased in order to create an electrostatic field perpendicular to the exit axis.

* * * * *